United States Patent [19]
Weber

[11] Patent Number: 5,621,753
[45] Date of Patent: Apr. 15, 1997

[54] DIGITAL COMMUNICATION SYSTEM AND A PRIMARY STATION FOR USE IN SUCH A SYSTEM

[75] Inventor: Hubert R. Weber, Eckental-Forth, Germany

[73] Assignee: Lucent Technologies Inc., Murray Hill, N.J.

[21] Appl. No.: 326,612

[22] Filed: Oct. 19, 1994

[30] Foreign Application Priority Data

Oct. 21, 1993 [EP] European Pat. Off. .............. 93202956

[51] Int. Cl.[6] ................................................. H04B 1/713
[52] U.S. Cl. ........................................ 375/202; 375/219
[58] Field of Search ..................................... 375/202, 219, 375/220; 370/24, 32; 455/73, 74, 78, 83, 88

[56] References Cited

U.S. PATENT DOCUMENTS 5,224,121  6/1993  Schorman ............................. 375/202

FOREIGN PATENT DOCUMENTS

| | | |
|---|---|---|
| 8846391 | 6/1992 | Australia . |
| 0590412A1 | 4/1994 | European Pat. Off. . |
| 9016122 | 12/1990 | WIPO . |

OTHER PUBLICATIONS

Behague et al, MRC Mobile Radio Conference, "Modularity and Flexibility: The Keys to Base station system Configuration for the GSM network", Nov. 13, '1991, pp. 161–168.

MRC Mobile Radio Conference, 13 Nov. 1991, Nice, FR pp. 161–168, Behague et al—"Modularity and Flexibility: The Keys to Base Station System Configuration for the GSM Network".

*Primary Examiner*—Stephen Chin
*Assistant Examiner*—Kevin Kim
*Attorney, Agent, or Firm*—Christopher N. Malvone

[57] ABSTRACT

In digital radio communication systems such as FDMA/TDMA digital cellular mobile radio systems, in which a number of radio base stations communicate with a number of mobile radio stations, frequency hopping is used to combat fading. That requires that data bursts be routed between the transceivers (RFU1, RFU2, ..., RFUn) and the transceiver controllers (RCC1, RCC2, ..., RCCn) in a radio base station according to a frequency hopping algorithm. Such routing has heretofore been done by transporting the data bursts over a bus which serves as a common distribution medium between the transceivers and the transceiver controllers. In order to achieve a more fault tolerant system, instead of a bus the invention uses as a common distribution medium point-to-multipoint links (RXL1, RXL2, ..., RXLn; TXL1, TXL2, ..., TXLn) between the receiver section of each transceiver and the receiver sections of all of the transceiver controllers, and between the transmitter section of each transceiver controller and the transmitter sections of all of the transceivers. In case of failure of a particular transceiver or transceiver controller, most of the existing traffic can still be handled. Also, the system can readily be reconfigured to become fully operative again, though with slightly reduced capacity.

8 Claims, 5 Drawing Sheets

5,621,753

DIGITAL COMMUNICATION SYSTEM AND A PRIMARY STATION FOR USE IN SUCH A SYSTEM

BACKGROUND OF THE INVENTION

1. Field of the Invention

The present invention relates to a digital communication system comprising at least one primary station arranged for frequency hopping based burst mode communication with a plurality of secondary stations, the primary station comprising a plurality of transceivers and a plurality of transceiver controllers which are coupled to the transceivers via a distribution medium. Such a system can be a digital cellular radio system in which the primary station is a radio base station and the secondary stations are mobile radio stations, or any other frequency hopping based digital communication system.

The present invention further relates to a primary station for use in such a system.

2. Description of the Related Art

A digital communication system and primary station of this kind are known from the International Patent Application WO 90/16122. In this Patent Application a radio base station for use in TDMA (Time Division Multiple Access) digital mobile radio systems is disclosed using frequency hopping techniques. The base station comprises a plurality of transceivers which are coupled to at least one antenna via a so-called combiner, and further a base station controller and a plurality of transceiver controllers. The transceiver controllers comprise channel codecs, speech codecs, and processors for handling signalling data or the like. For efficiently implementing a so-called baseband switching frequency hopping technique, the transceivers and the transceiver controller are coupled to a bus as a common distribution medium, the bus also being coupled to the base station controller. The transceiver comprises a receiver for receiving data such as voice data or other data from mobile stations and a transmitter for transmitting data to the mobile stations on a TDMA basis. Via the bus, when receiving, for particular mobile subscribers time slots e.g. containing bursts of digitally coded speech are directed to the correct transceiver controller as determined by a frequency hopping algorithm comprised in the base station controller, i.e. on a TDMA frame basis, each transceiver is connected with the correct transceiver controller. When transmitting a similar approach is taken. With baseband switching frequency hopping, the transceivers are tuned to fixed frequencies, the TDMA bursts to and from particular mobile subscribers having varying time slot positions within the TDMA frames. Such a bus structure as a common distribution medium is disadvantageous as to fault tolerance of the system. For a fault tolerant system, the bus should be doubled (redundancy).

SUMMARY OF THE INVENTION

It is an object of the present invention to provide digital communication system of the above type which is fault tolerant, and which can easily support said baseband switching type frequency hopping technique, and further a synthesizer hopping technique.

To this end a digital communication system according to the present invention is characterised in that the distribution medium comprises point-to-multipoint links between transceiver receiver sections and the transceiver controllers, and between the transceiver controllers and transceiver transmitter sections. It is achieved that, when a transceiver or a transceiver controller fails, only one line is down. Although, in the case of baseband switching, the traffic processing capacity of the primary or base station is slightly reduced when a transceiver controller goes down, and less frequencies are available when a transceiver goes down, the system is highly fault tolerant. With such failure, most of the current traffic can still be handled. The system can simply be reconfigured to a 100% working system, though with reduced capacity.

In an embodiment of a digital communication system according to the present invention point-to-multipoint links are shared by at least two transmitter receiver sections, and further point-to-multipoint links are shared by at least two transceiver controllers. Although with some reduced fault tolerancy, in this embodiment the number of physical connection lines between the transceivers and the transceiver controllers is reduced.

In an embodiment of a digital communication system according to the present invention the point-to-multipoint links are divided into data links and timing links, whereby the data links are coupled between the transceivers and the transceiver controllers, and the primary station comprises a primary station controller which is coupled to the timing links, the timing links controlling the transceivers and the transceiver controllers. In this way synchronous data transfer is achieved.

In an embodiment of a digital communication system according to the present invention at least the timing links are duplicated. Although the system is also fault tolerant as to the timing links because any of the units coupled to a timing link can take over control as a master in case the actual master goes down, with this redundancy it is achieved that the system is still more reliable.

Further embodiments allow the system to be configured for both baseband switching frequency hopping and synthesizer hopping frequency hopping. In case of synthesizer hopping each transceiver comprises a synthesizer which can quickly be adjusted to each frequency of the so-called hopping cluster, i.e. the group of transceivers which are grouped together using a predetermined set of frequencies for their traffic.

BRIEF DESCRIPTION OF THE DRAWINGS

The present invention will now be described, by way of example, with reference to the accompanying drawings, wherein FIG. 1 schematically shows a digital communication system according to the present invention.

Throughout the figures, the same reference numerals are used for the same features.

DESCRIPTION OF THE PREFERRED EMBODIMENTS

Figure 1:
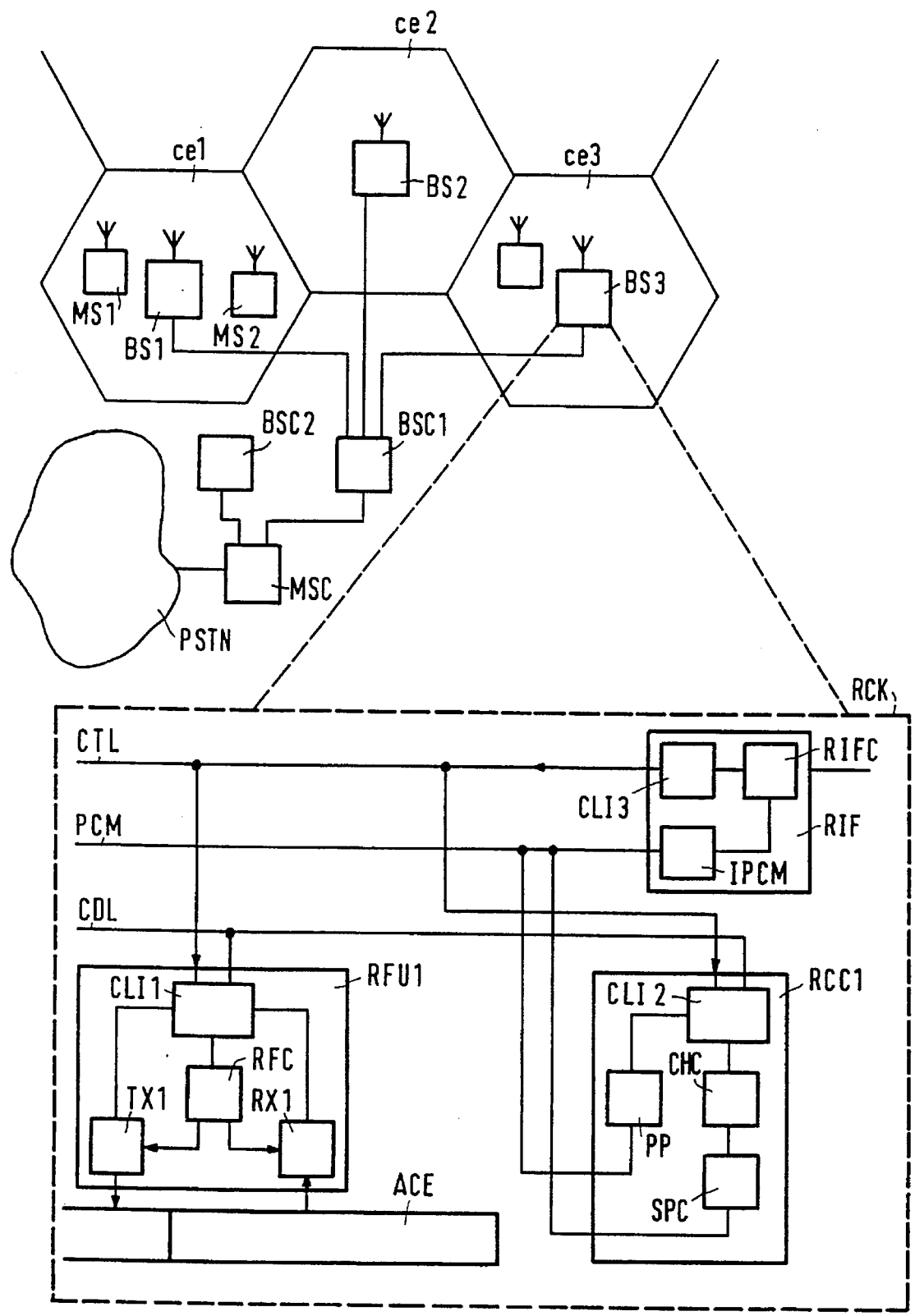

FIG. 1 schematically shows a digital communication system 1 according to the present invention, comprising radio base station transceivers as primary stations BS1, BS2, and BS3 in cells ce1, ce2, and ce3 respectively. The primary stations BS1, BS2, and BS3 are arranged for frequency hopping based burst mode communication with a plurality of secondary stations MS1, MS2, and MS3. The digital communication system can be any frequency hopping based digital communication system. In the example given it will be assumed that the primary stations BS1, BS2, and BS3 are radio base stations transceivers providing radio communication in the respective cells ce1, ce2, and ce3, and that the secondary stations MS1, MS2, and MS3 are mobile radio stations roaming through the cells ce1, ce2, and ce3. An example of such a system is a so-called GSM System (Global System for Mobile Communications, Groupe Special Mobile). In order not to cause interference with neighbouring cells, the radio base stations transceivers, at least in adjacent cells, transmit and receive at different frequencies. In the said GSM system, which is a time division multiple access (TDMA) mobile radio system, each radio base station transceiver BS1, BS2, and BS3 transmits at a number of frequencies, e.g. twelve frequency channels. With eight time slots per frequency channel, 96 logical channels are available for radio communication per base station, then. In principle, the radio base stations transceivers BS1, BS2, and BS3 communicate with the mobile radio stations MS1, MS2, and MS3 when present in their respective cells ce1, ce2, and ce3, in the given example the radio base station transceiver BS1 communicating with the mobile radio stations MS1 and MS2, and the radio base station transceiver BS3 communicating with the mobile radio station MS3. When the mobile radio stations MS1, MS2, and MS3 are roaming through the cells ce1, ce2, and ce3, a so-called handover from one radio base station transceiver to another occurs if the quality of the communication link deteriorates. That is a system control function carried out by a Mobile Switching Centre MSC, which is connected to the radio base stations transceivers BS1, BS2, and BS3 via a base station controller BSC1. Also other clusters of radio base stations are coupled to the MSC via a further base station controller, e.g. BSC2. The MSC is connected to a Public Switched Telephone Network PSTN, in case of Public Mobile Radio. Instead of a PSTN, the MSC can also be connected to an Integrated Services Digital Network as a digital telephony network. For globally averaging fading phenomena in such a digital mobile radio system, so-called frequency hopping techniques are applied which are well-known per se. For implementing such techniques the radio base stations transceivers BS1, BS2, and BS3 each comprise a number of transceivers. In one frequency hopping technique, a so-called baseband switching frequency hopping technique, the transceivers are tuned to different fixed frequencies. Then, frequency hopping is achieved by switching each traffic channel over the various transceivers corresponding to the frequencies included in the frequency hopping scheme or algorithm, such algorithms being well-known per se. In another frequency hopping technique, a so-called synthesizer hopping frequency hopping technique, the transceivers are tuned from one frequency to another before each hop. In principle, baseband switching frequency hopping is a preferred technique, because of delays caused by tuning of synthesizers in the synthesizer hopping technique, and because of the necessity of having fast and complicated synthesizers available. In small cellular networks, however, the base stations do not have enough transceivers to implement a baseband switching frequency hopping technique and so synthesizer hopping is implemented. As will be described hereinafter, the present invention allows for both baseband switching and synthesizer hopping frequency hopping techniques. For a more detailed description of a cellular radio system, and further, a more detailed description of frequency hopping techniques, reference may be made to articles in Conference Proceedings of the Digital Cellular Radio Conference DCRC, Oct. 12–24, 1988, Hagen, Westfalia, FRG, "An Overview of the GSM System", B. J. T. Mallinder, pp. 1a/1–1a/13, "The Base Transceiver Station (BTS) to Base Station Controller Interface A-bis", H. Rosenlund, pp. 5b/1–5b/11, and "Options for the Implementation of Network Infrastructure", G. Mazziotto, pp. 6a/1–6a/11. In Chapter 8, "The GSM System", par. 8.3.4, "Frequency Hopping", pp. 698–700, of the handbook, "Mobile Radio Communications", R. Steele, Pentech Press, London, 1992, a GSM Frequency Hopping Algorithm is disclosed.

In FIG. 1, part of the radio base station transceiver BS3 is shown in more detail. Shown is a transceiver or RF-unit RFU1 comprising an RF-controller RFC1 controlling a transmitter radio part TX1 which modulates and transmits a baseband signal, and a receiver radio part RX1 which receives, demodulates and digitizes a received radio signal. The transmitter part TX1 and the receiver part are coupled to antenna coupling equipment ACE, and further to a cluster link interface CLI1 which is also coupled to the RF-controller RFC1. According to the present invention, the cluster link interface CLI1 is coupled to a point-to-multipoint cluster data link CDL and to a point-to-multipoint cluster timing link CTL, both links being coupled to similar RF-units (not shown). Further coupled to the links CDL and CTL is a radio codec and control unit RCC1, corresponding to the RF-unit RFU1. The radio codec and control unit RCC1 comprises a cluster link interface CLI2 coupled to channel codecs CHC which are coupled to a 64 kbits/sec PCM link PCM via speech codecs SPC. The cluster link interface CLI2 is further coupled to the PCM link PCM via a processor pool PP for carrying out other tasks than coding/decoding, such as monitoring, maintenance and the like. In the present context, cluster means the group of transceivers which are grouped so as to use a single set of frequencies for their traffic on the basis of frequency hopping techniques, i.e. the transceivers form a so-called hopping cluster. In one embodiment all participants of the hopping cluster are within a single rack RCK, the rack RCK being controlled by a rack interface unit RIF comprising a cluster link interface CLI3 coupled to the cluster timing link CTL and to the PCM link PCM via internal PCM hardware IPCM. The rack interface unit RIF further comprises a rack interface controller RIFC. Apart from the data links CDL as cooperating with the RF-units and the radio codec and control units as to the present invention, the base station 3 operates as a GSM base station, well-known in the art. The rack interface unit RIF acts as a master unit and controls the timing on the cluster timing link CTL, to be described subsequently. The data which are transmitted between the RF-units and the radio codec and control units, and vice versa, are basically the transmit data/receive data for/from mobile radio stations, i.e. the traffic, as well as control data for the RF-units with respect to the traffic itself, i.e. frequency offset of the synthesizer, timing offset in the frame, channel information, and the like. In addition to this data, in a single packet, a so-called operations and maintenance packet, an RF-unit may be remotely controlled by a radio codec and control unit, thus allowing direct communication between RF-units and radio codec and control units. Then, the communication medium is the cluster data link CDL. In another embodiment the hopping cluster may be divided over various racks.

Figure 2:
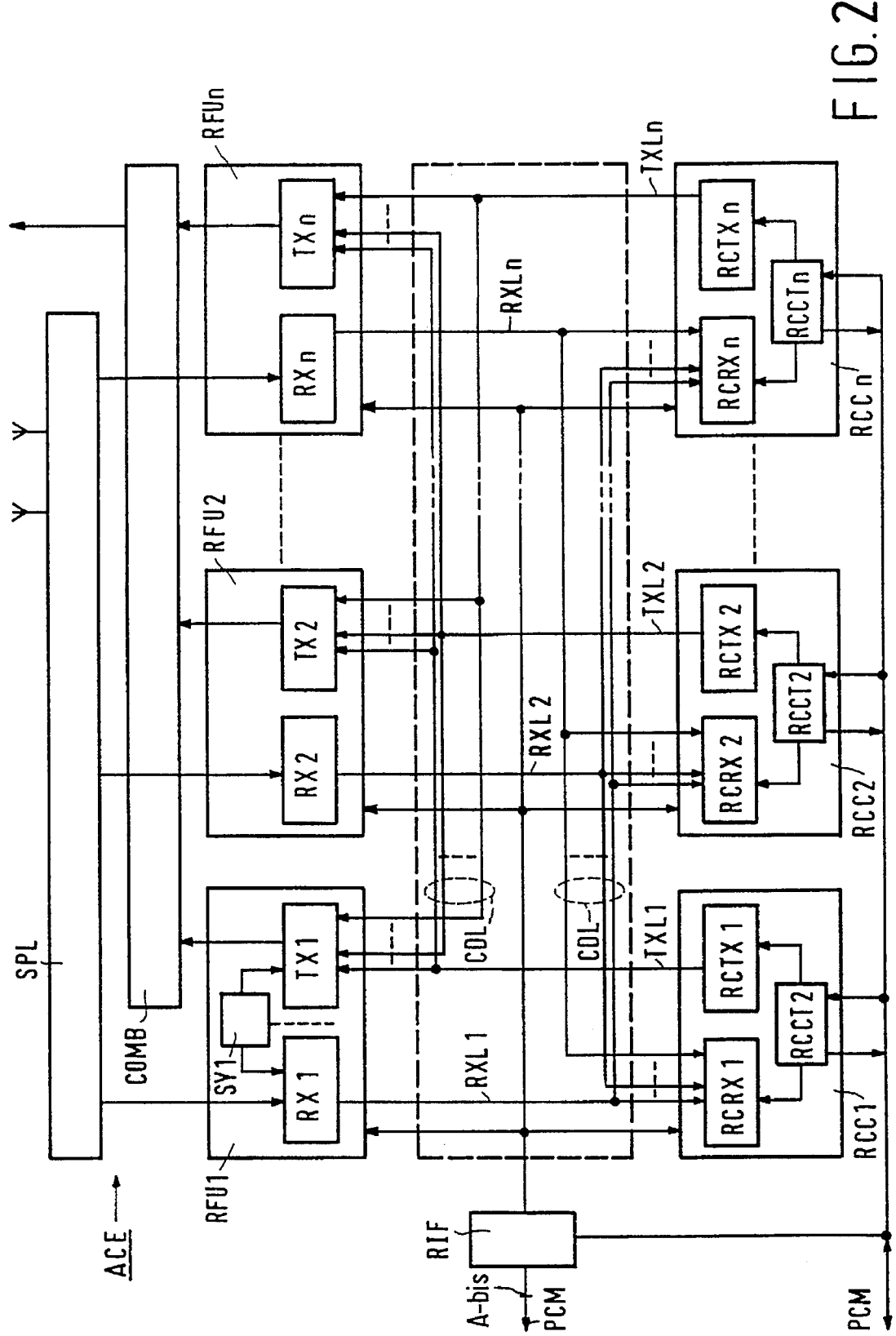
FIG. 2 is a blockdiagram of a first embodiment of a primary station for use in such a system.

FIG. 2 is a blockdiagram of a first embodiment of a base station BS1, BS2, and BS3 as a primary station for use in the system in FIG. 1. Shown are the transceivers RFU1, RFU2, ..., RFUn, n being a predetermined integer, and further the transceiver controllers RCC1, RCC2, ..., RCCn. The RF-units RFU1, RFU2, ..., RFUn are coupled to a combiner COMB with their respective transmitter parts TX1, TX2, ..., TXn, and to a receiver multi-coupler or splitter SPL with their respective receiver parts RX1, RX2, ..., RXn. The transceivers comprise synthesizers, a synthesizer SY1 being shown for the transceiver RFU1. The synthesizers are tuned in a known way. The transceiver controllers RCC1, RRC2, ..., RCCn, comprise codecs and processors as shown in FIG. 1, which are shown in FIG. 2 as radio codec transmit part RCTX1 to indicate a transmit part thereof as being coupled to the transmitter part TX1 of the transceiver RFU1, and as radio codec receive part RCRX1 to indicate a receive part thereof as being coupled to the receiver part RX1 of the transceiver RFU1, and control circuitry RCCT1 to indicate further functionality. In the part RCRX1, channel decoding and speech decoding is carried out, and in part RCTX1, speech coding and channel coding is carried out. The receiver part RX1 is coupled to the receive parts RCRX1, RCRX2, ..., RCRXn via a point-to-multipoint link RXL1, as are the receiver parts RX2, ..., RXn via respective point-to-multipoint links RXL2, ..., RXLn. The radio codec transmit part RCTX1 is coupled to the transmitter parts TX1, TX2, ..., TXn via a point-to-multipoint link TXL1, as are the radio codec transmit parts RCTX2, ..., RCTXn via respective point-to-multipoint links TXL2, ..., TXLn. The links RXL1, RXL2, ..., RXLn, TXL1, TXL2, ..., TXLn form the cluster data link CDL. A point-to-multipoint cluster timing link CTL is coupled to the rack interface unit R/F, being the master, to the transceivers RFU1, RFU2, ..., RFUn, and to the transceiver controllers RCC1, RCC2, ..., RCCn. For redundancy the timing link CTL may be duplicated.

Figure 3:
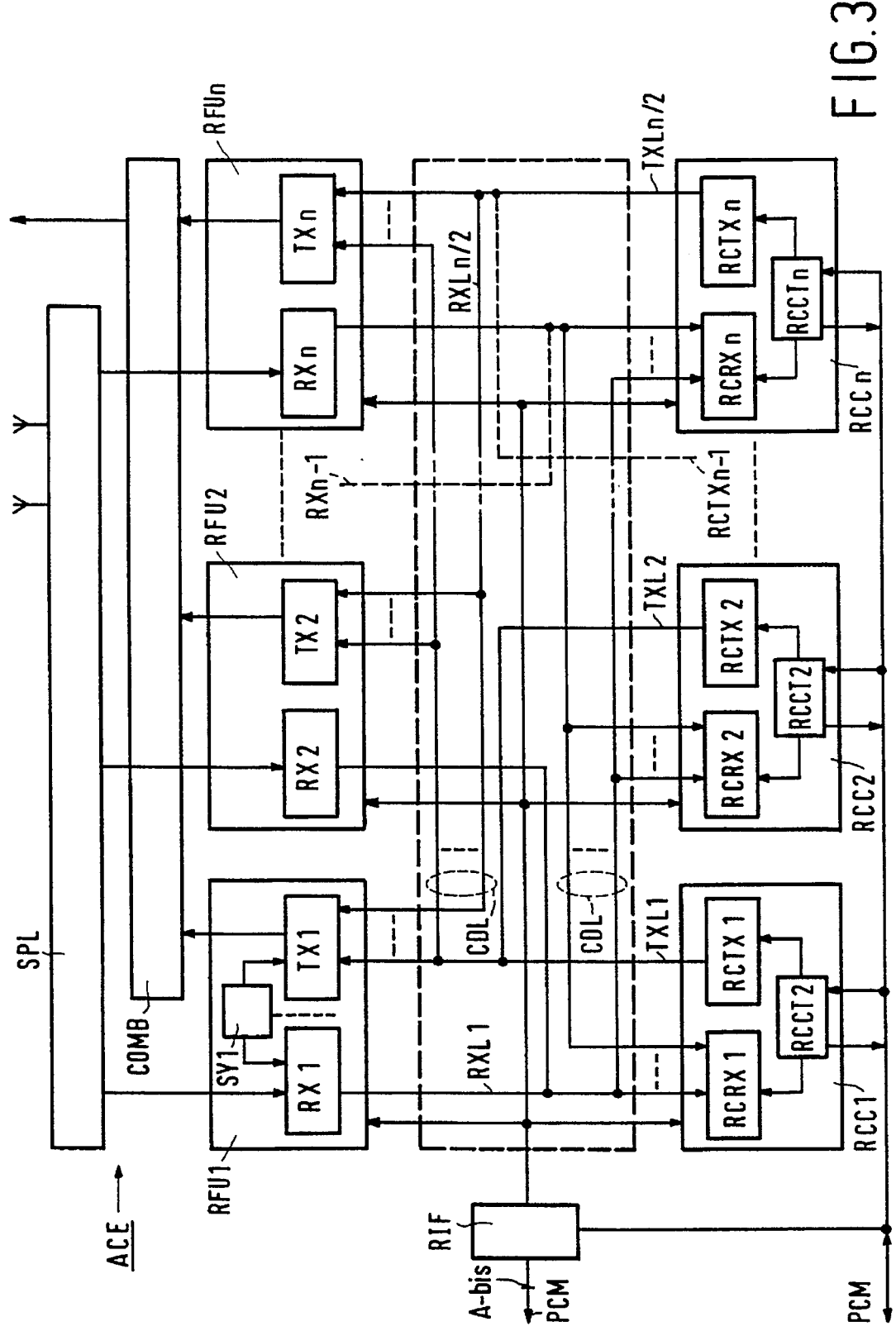
FIG. 3 is a blockdiagram of a second embodiment of a primary station.

FIG. 3 is a blockdiagram of a second embodiment of the radio base station transceiver BS1, BS2, and BS3 as a primary station. In this embodiment, being a sub-multiplexing variant, the receiver parts RX1 and RX2 share the link RXL1, to the receiver parts RXn-1 and RXn, sharing the link RXLn/2, and the radio codec and control transmit parts RCTX1 and RCTX2 share the link TXL1, to the radio codec and control transmit parts RCTXn-1 and RCTXn, sharing the link TXLn/2. In this embodiment the number of physical connection lines at one side is reduced by a factor of two. Further reduction factors may be implemented.

Figure 4:
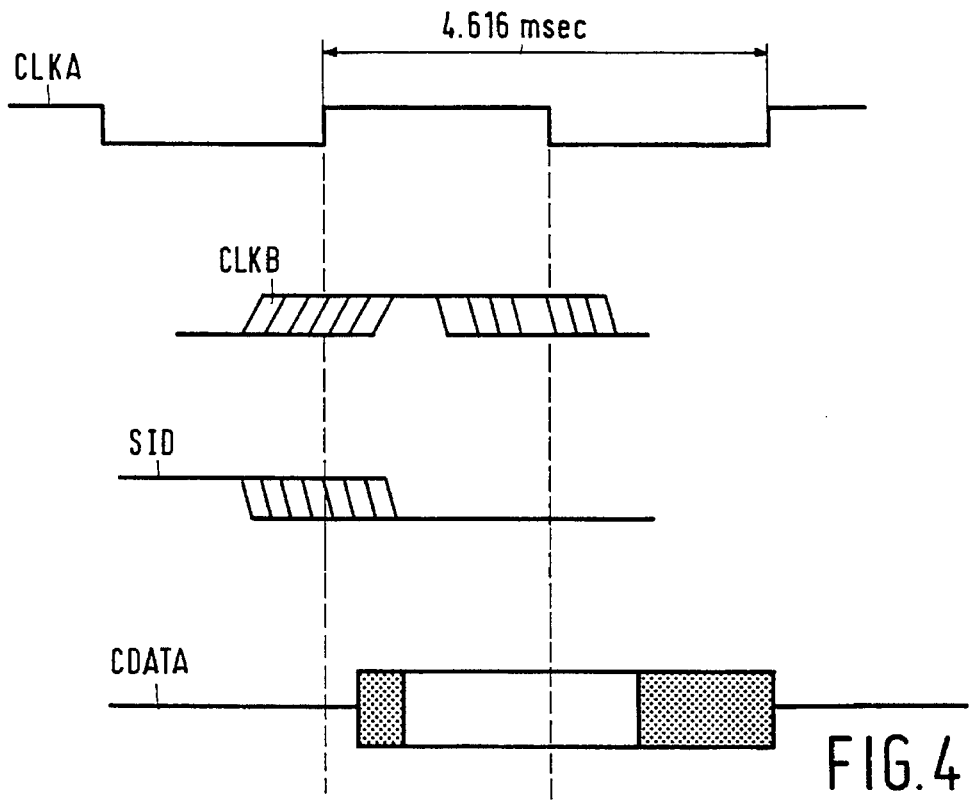
FIG. 4 shows timing signals on the timing links.

FIG. 4 shows timing signals on the timing links CTL, hatched lines showing uncertainty in timing. The cluster timing link CTL is used to ensure that all transceivers and transceiver controllers operate synchronously. Basically a 2.17 MHz clock signal and a synchronisation information data signal SID are transmitted on the timing link CTL, the clock being generated in the master RIF. For redundancy, the clock line is duplicated as CLKA and CLKB. The master can derive its clock signal from the incoming PCM link. The clock is used within the cluster link interfaces CLI1, CLI2, CLI3, ..., for receiving and transmitting data on the cluster data links CDL. The clock is generated according to GSM Recommendations. The SID signal is a data stream at a data rate of 2.17 MHz, the same as for the cluster data links. The SID signal is updated on a per TDMA frame basis, i.e. with a period of 4.616 msec. With CDATA data on the cluster data links are indicated.

Figure 5:
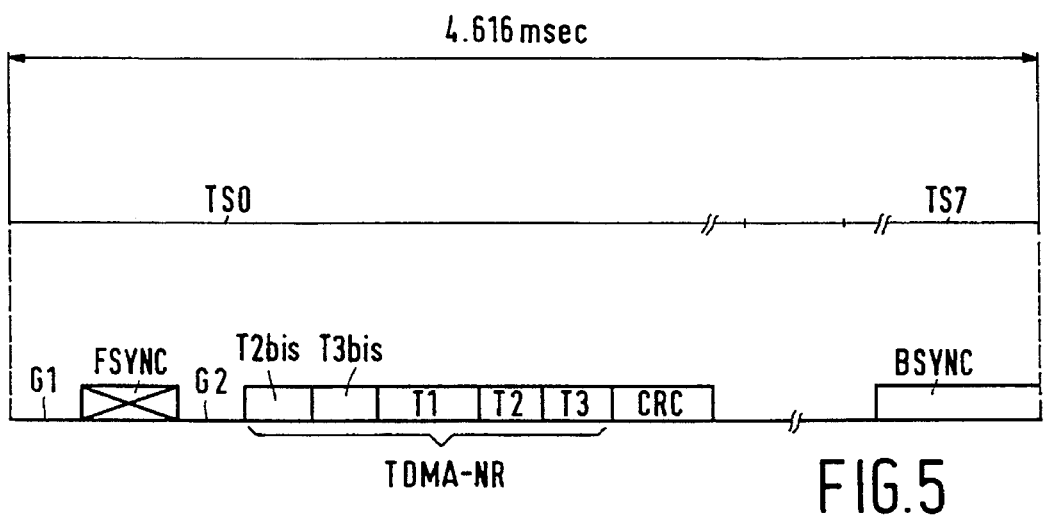
FIG. 5 shows a structure of a SID signal.

FIG. 5 shows a structure of the SID signal, which comprises a so-called TDMA number TDMA-NR in accordance with GSM Recommendation 05.02, with components T2bis, T3bis, T1, T2, and T3, for synchronisation purposes. The SID signal further comprises a frame sync pattern FSYNC between two guard bands G1 and G2, a CRC, and a bit sync pattern BSYNC. The TDMA number TDMA-NR is updated on a per frame basis, the TDMA number changing at the transition of time slot TS7 to time slot TS0. The TDMA number TDMA-NR is fed to the rest of the system in a frame following the one in which it appears on the timing link CTL. In this way it is guaranteed that everything, concerning synchronisation, has been correctly decoded before the rest of the system receives the TDMA number. The bit sync pattern BSYNC is used as a final sync check. The principle of operation is, once synchronised, the cluster link interfaces maintain their own value for the TDMA number and maintain phase synchronisation independently from the cluster timing link CTL. The cluster links interfaces at all times monitor the SID signal and obtain phase synchronisation and the TDMA number from the bus, only when requested to do so.

Figure 6:
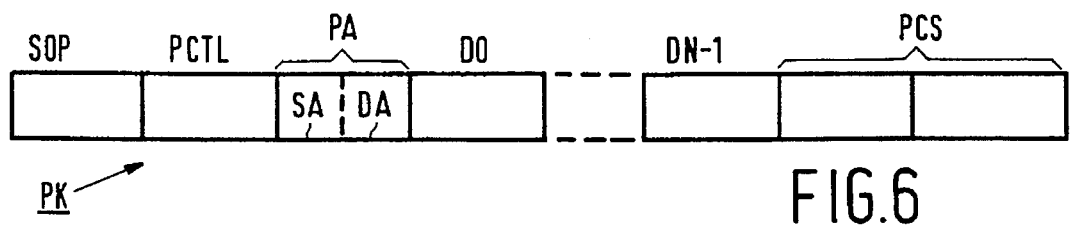
FIG. 6 shows a packet structure of a packet on the data links, FIG. 7 shown an RF-unit.

FIG. 6 shows a packet structure of a packet PK on the data links. The packet contains 8 bits start-of-packet SOP, 8 bits packet control PCTL, an 8 bits packet address PA at least containing a 4 bits destination address DA, and, optionally, a four bits source address SA, N*8 bits data D0, ..., DN-1, N being an integer indicating a variable length data section, and a 16 bits packet check sequence PCS. Data on the cluster data links are transferred in packets on a per GSM time slot basis, the relation between the GSM time slots and the frame synchronisation being provided by the SID signal. The start-of-packet SOP is used by packet receivers to determine whether or not a packet exists. A transceiver of radio codec and control unit should send an all zero logic pattern when not transmitting a packet. The SOP signal is generated in the cluster link interfaces. The packet control PCTL, which is generated by an external source, indicates the type of data in the data fields D0, ..., DN-1, types TX Data, TX Control, RX Control, RF Data, and O&M (Operations and Maintenance), respectively. The source address SA is the address of the transceiver or transceiver controller transmitting data via the data link, and the destination address DA is the address of the receiving transceiver or transceiver controller. So, by proper routing, different packet within corresponding time slots in successive frames may be sent to different destinations. From transceiver controller to transceiver: TX Data is 148 bits; TX Control comprises 3 bits TX Channel Index; RX Control comprises 3 bits RX Channel Index; O&M is 40 bits. From transceiver to transceiver controller: RF Data comprises RX Data; O&M is 40 bits. TX Data, the format of which is defined in GSM Rec. 05.02, is the information to be transmitted on the air interface during the current time slot. The TX Channel Index is used by the transceiver a pointer to a radio frequency channel. The RX Channel Index provides a pointer to a radio frequency channel. The channels corresponding to each pointer value should be available to the transceiver. RF Data is used to transfer a received data burst and associated parameters from the transceiver to the transceiver controller. Data transfer on the cluster data links is synchronised to the start of a time slot. An operation and maintenance channel is provided between transceiver controllers and transceivers in both directions, and is a single packet as described before, i.e. is a single packet per time slot. In the case of GSM control and data packets, the frequency hopping algorithm ensures that two transceivers or transceiver controllers are not transmitting to the same destination simultaneously. The O&M channel is exclusively used between a transceiver controller and its associated transceiver, and the transceiver only puts data on the O&M channel when requested to do so by the transceiver controller. Via the O&M channel the system is configured before being put into operation. When both the source address SA and the destination address DA are present, only a hopping algorithm, which is known per se e.g. from GSM Recommendation 05.02, Chapter 6.2.3, is present in the transceiver controller RCC, because of the fact that a transceiver knows to which transceiver controller it should transmit a received data packet. Such an implementation is a preferred one. When only the destination address DA is present, extra software has to be loaded into the RF-controllers RFC for unambiguous routing of data packets. Then, care has to be taken that the hopping algorithm is consistent with the extra software loaded into the RF-controllers, i.e. when changing the hopping algorithm the software in the RF-controllers has to be adapted accordingly. Via the TX Control field, controlling frequency adjustment of a transceiver, the TX Channel Index being the output of the frequency hopping algorithm. Which of the frequency hopping techniques is implemented, baseband switching frequency hopping or synthesizer hopping frequency hopping depends on the physical hardware of the base station. With a fixed filter/combiner frequency hopping is restricted to baseband switching, whereby the transceivers are adjusted to a fixed frequency, and time slots for a particular subscriber have a varying destination for successive frames. Then, only a single channel is filtered out, whereas all other channels are attenuated. In this implementation transmitters can be combined without giving rise to large output losses, an advantage for larger base stations. With a hybrid combiner without filter, i.e. a broadband combiner, synthesizer hopping can be implemented, whereby the frequency of the transceiver varies with a constant destination address for a particular subscriber from time slot to time slot. In a hybrid combiner transmitter outputs are interconnected via a starpoint having no filtering characteristics. Only two transmitter outputs can be coupled with each other at a starpoint, so, when combining more than two transmitters, the starpoints have to be cascaded, giving rise to relatively high output power losses. The latter hopping technique can be used in relatively small cellular systems where not enough synthesizers are available to implement baseband switching. In case of baseband switching the result of the calculation from the frequency hopping algorithm, the Channel Index, is interpreted and mapped onto a transceiver address using that fixed frequency and data are sent to the respective transceiver via the cluster data link. In case of synthesizer hopping, the Channel Index is sent directly to the transceiver corresponding to a transceiver controller and the transceiver is tuned accordingly. In the above implementations, the combiners are known per se.

Figure 7:
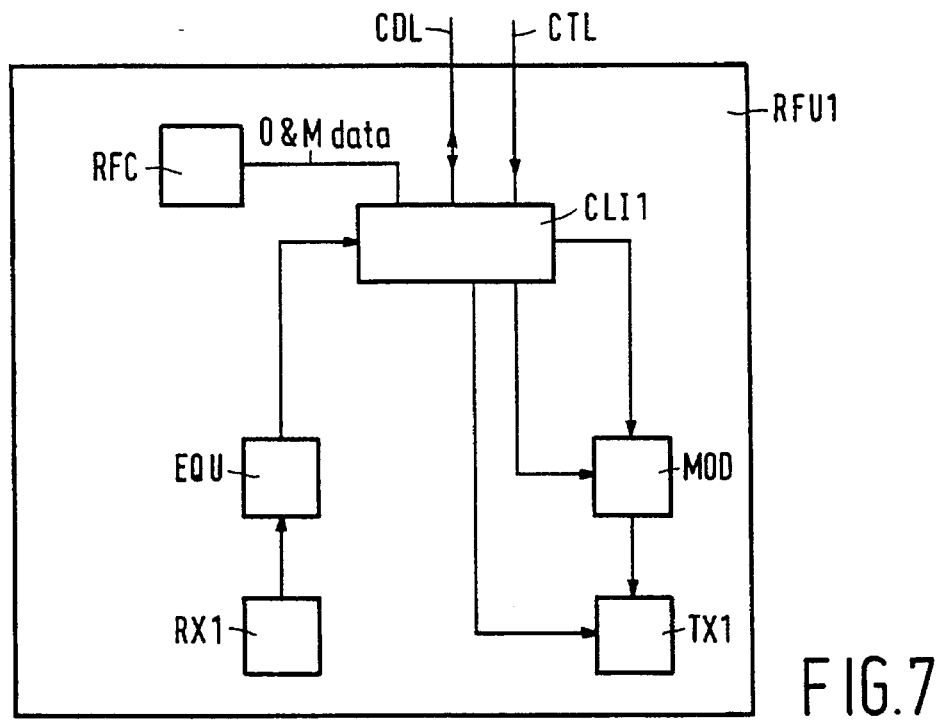

FIG. 7 more in detail shows an RF-unit RFU1 in which also an equaliser EQU and a modulator MOD are shown. The cluster link interface CLI1 provides control information to the modulator MOD and the transmit part TX1 such as frequency channel adjustment data, and receives data from the receive path for direction to a selected destination. The RFC provides so-called O&M data (Organisation & Management data) to the cluster link interface CLI1 such as configuration data allowing operation of synthesizer hopping or baseband hopping and general control data for the RF-unit.

Figure 8:
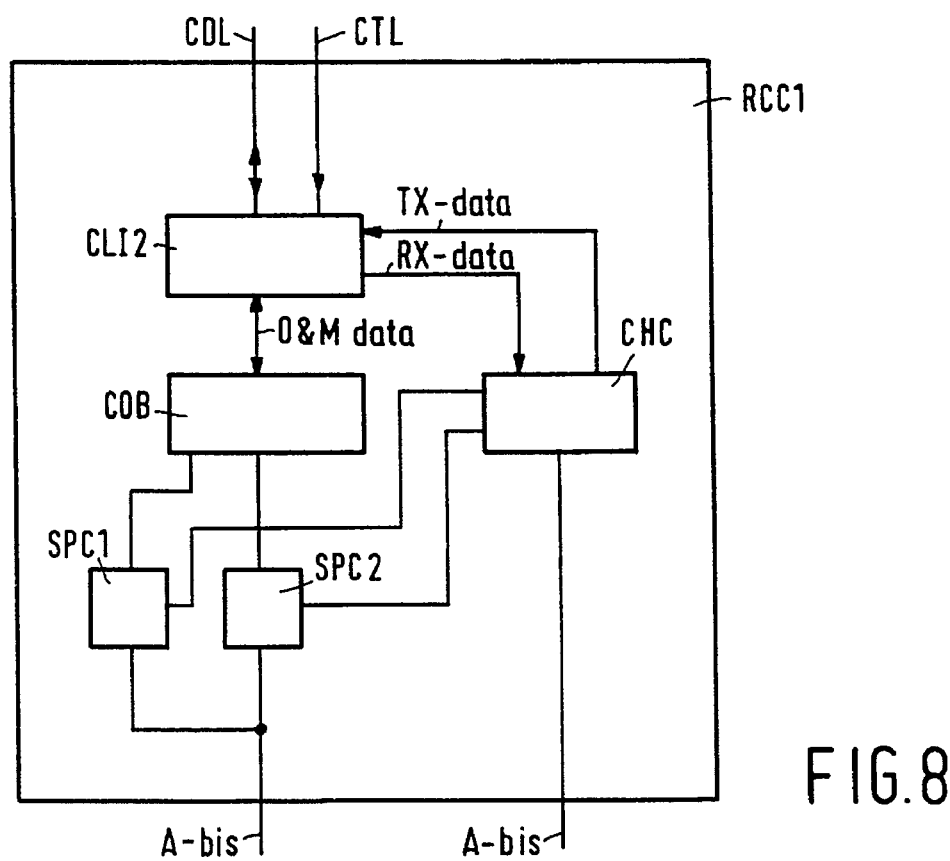
FIG. 8 shows a radio codec and control unit.

FIG. 8 more in detail shows a transceiver controller RCC1 in which a number of signal processor controller SPC1 and SPC2 are coupled to the cluster link interface CLI2 via a cluster output board COB to which further a number of channel codecs CHC are coupled. The channel codecs CHC are coupled to the cluster link interface CLI2 and to the A-bis interface and process received data RX-data and transceive data TX-data.

I claim:

1. A primary station for use in a digital communication system having a plurality of secondary stations and wherein the primary station communicates with each of the secondary stations by frequency hopping of time division data bursts among different frequency channels; said primary station comprising:

a plurality of transceivers each of which includes a transmitter section (TX1, TX2 ..., TXn) and a receiver section (RX1, RX2 ..., RXn);

a plurality of transceiver controllers (RCC1, RCC2, ..., $RCC_n$), each of which has a transmitter section and a receiver section, and which in accordance with a frequency hopping algorithm supply data bursts to the transmitter sections of each of said transceivers and receive data bursts from the receiver sections of each of said transceivers; and a distribution arrangement for coupling the transceivers to the transceiver controllers, said distribution arrangement comprising (i) a first set of point-to-multipoint links (RXL1, RXL2, ..., $RXL_n$) which respectively couple the receiver section of each respective transceiver to the receiver sections of all of the transceiver controllers, and (ii) a second set of point-to-multipoint links (TXL1, TXL2, ..., TXLn) which respectively couple the transmitter section each respective transceiver controller to the transmitter sections of all of the transceivers;

each of said sets of point-to-multipoint links being divided into data links (CDL) and timing links (CTL), the links between the transceivers and the transceiver controllers being data links; and a primary station controller (RIF) coupled to said timing links for supplying operation control signals to the transceivers and to the transceiver controllers by way of said timing links.

2. A primary station as claimed in claim 1, wherein each of the links in said first set are shared by the receiver sections of at least two transceiver controllers, and each of the links in said second set are shared by the transmitter sections of at least two transceivers.

3. A primary station as claimed in claim 1, wherein the timing links (CTL) provide a clock signal (CLKA, CLKB) and a synchronizing signal (SID) for timing data transfer between the transceivers and the transceiver controllers.

4. A primary station as claimed in claim 3, wherein each timing link (CTL) is at least duplicated.

5. A primary station as claimed in claim 1, wherein data on the data links (CDL) is transferred in packets (PK), each packet having a packet address (PA) for routing the packet.

6. A primary station as claimed in claim 5, wherein the packet address (PA) contains a source address (SA) and a destination address (DA).

7. A primary station as claimed in claim 5, wherein the packet address (PA) contains a destination address (DA), and each of the transceivers comprises a frequency hopping radio frequency controller.

8. A primary station as claimed in claim 5, wherein the packets (PK) comprise a control field which includes frequency adjustment data (TX Channel Index, RX Channel Index) for adjusting the frequency of the transceivers.

* * * * *